US008892100B2

(12) United States Patent
Takahashi et al.

(10) Patent No.: US 8,892,100 B2
(45) Date of Patent: Nov. 18, 2014

(54) RADIO COMMUNICATION METHOD, RADIO MOBILE DEVICE AND RADIO BASE STATION ACCOMODATION APPARATUS

(75) Inventors: Yosuke Takahashi, Yokohama (JP); Akihiko Yoshida, Yokohama (JP); Daigo Takayanagi, Yokohama (JP); Shiro Mazawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/305,857

(22) Filed: Nov. 29, 2011

(65) Prior Publication Data

US 2012/0069821 A1 Mar. 22, 2012

Related U.S. Application Data

(63) Continuation of application No. 12/023,056, filed on Jan. 31, 2008.

(30) Foreign Application Priority Data

Mar. 26, 2007 (JP) .................. 2007-078138

(51) Int. Cl.
*H04W 36/30* (2009.01)
*H04W 80/04* (2009.01)
*H04W 36/02* (2009.01)
*H04W 92/04* (2009.01)
*H04W 36/08* (2009.01)

(52) U.S. Cl.
CPC ............ *H04W 36/02* (2013.01); *H04W 92/045* (2013.01); *H04W 36/08* (2013.01)
USPC .......................................... 455/436; 370/331

(58) Field of Classification Search
CPC ............................. H04W 36/30; H04W 80/04
See application file for complete search history.

(56) References Cited

U.S. PATENT DOCUMENTS 8,284,777 B2 * 10/2012 Torsner et al. ................ 370/394
2003/0224786 A1  12/2003 Lee et al.
(Continued)

FOREIGN PATENT DOCUMENTS

JP  2000-069531  3/2000
JP  2006-067609  3/2006

OTHER PUBLICATIONS

Cdma2000 High Rate Packet data Supplemental Services, 3GPP2 C.S0063-A, 3rd Generation Partnership Project 2, Version 1.0, Apr. 2006.

(Continued)

*Primary Examiner* — Rafael Pérez-Gutiérrez
*Assistant Examiner* — Frank Donado
(74) *Attorney, Agent, or Firm* — Antonelli, Terry, Stout & Kraus, LLP.

(57) ABSTRACT

A radio communication method in which, when hand-off of the down direction is performed while a radio mobile device subjects one application packet of the up direction to fragmentation to divide the one application packet into a plurality of radio packets and transmits the plurality of radio packets, sequence numbers of radio packets managed by a first radio base station to the plurality of fragmented radio packets of the one application packet even after the hand-off of the down direction is performed and to apply sequence numbers of radio packets managed by a second radio base station to fragmented radio packets of the application packet transmitted subsequently after completion of transmission of the plurality of fragmented radio packets of the one application packet; and making a radio base station accommodation apparatus identify a radio base station and restore data for each radio base station.

6 Claims, 14 Drawing Sheets

(56) References Cited

U.S. PATENT DOCUMENTS

2007/0091888 A1* 4/2007 Koide et al. .................. 370/389
2007/0133470 A1* 6/2007 Cha et al. ..................... 370/331
2007/0140171 A1* 6/2007 Balasubramanian ......... 370/331
2007/0224993 A1* 9/2007 Forsberg ....................... 455/436
2008/0037548 A1    2/2008 Yi et al.
2009/0213810 A1    8/2009 Shousterman et al.

OTHER PUBLICATIONS

Cdma2000 High Rate Packet Data Supplemental Services, 3GPP2 C.S0063-A Version 2.0, Mar. 2007, $3^{rd}$ Generation Partnership Project 2 "3GPPZ".

* cited by examiner

RADIO COMMUNICATION METHOD, RADIO MOBILE DEVICE AND RADIO BASE STATION ACCOMODATION APPARATUS

CROSS REFERENCE TO RELATED APPLICATION

This is a continuation of U.S. application Ser. No. 12/023,056, filed Jan. 31, 2008. This application relates to and claims priority from Japanese Patent Application No. 2007-078138, filed on Mar. 26, 2007. The entirety of the contents and subject matter of all of the above is incorporated herein by reference.

BACKGROUND OF THE INVENTION

The present invention relates to a radio communication method, a radio mobile device and a radio base station accommodation apparatus and particularly to a radio communication method, a radio mobile device and a radio base station accommodation apparatus which can restore data certainly irrespective of network conditions upon hand-off.

The 3rd Generation Partnership Project 2 (3GPP2) which is the International Organization for Standardization standardizes the CDMA (Code Division Multiple Access) 2000 1xEV-DO (1x Evolution-Data Only) system which is the mobile radio communication system specialized exclusively to the data communication. This system improves the frequency utilization efficiency by being specialized to the data communication. In the CDMA 2000 1xEV-DO system, when data communication requiring high real-time efficiency such as VoIP (Voice over Internet Protocol) is performed, there is a problem that a data transmission stop period occurs upon hand-off and jitter occurs due to it. As measures for solving this problem, the hand-off method using the protocol named the Route Selection Protocol (RSP) is standardized in C. S0063-0 v2.0 which is 3GPP2 standard. Furthermore, A. S0008-C and A. S0009-C stipulating the protocol between base stations to which RSP is applied is being stipulated currently.

In the hand-off method using RSP, the Radio Link Protocol (RLP) of the data transmission protocol having the independent sequence number management system is provided in each of hand-off source base station and hand-off destination base station. The RLP is the protocol for performing retransmission control and order control for compensating for lack of packet and change of packet order occurring in radio transmission and manages the sequence numbers in order to realize it. By using the RLP, any base station can perform receiving processing properly when the base station receives data from a mobile device.

In the hand-off method using RLP, there are two RLPs for hand-off source and hand-off destination. Each of the RLPs is named route and, for example, the route for the hand-off source is named route A, the route for the hand-off destination being named route B. Conversely, the route for the hand-off source may be named route B and the route for the hand-off destination may be named route A. In this specification, the route A is applied to the hand-off source and the route B is applied to the hand-off destination.

The RLP stipulates the protocol for changing route for making communication. A mobile device makes communication using route A upon communication in hand-off source and makes communication using route B upon communication after hand-off. This change of routes can be performed instantaneously, so that the data communication stop time upon hand-off is minimized.

IP packets transmitted from a mobile device through a base station to an application server are subjected to HDLC (High-level Data Link Control) like framing according to RFC (Request for Comments) 1662 in the mobile device. Then, RLP packets which are radio packets are produced by C. S0063-0 v2.0 and are transmitted to the base station by CDMA 2000 1xEV-DO radio according to C. S0024-A. The base station restores the RLP packets from the data received by the 1xEV-DO radio and subjects the RLP packets to deframing by HDLC like framing to restores the IP packets. The IP packets are sent to the application server to make data communication possible.

SUMMARY OF THE INVENTION

When the mobile device transmits IP packet to the application server through the base station, the IP packet is subjected to HDLC like framing to be fragmented into a plurality of packets in the form suitable for radio transmission, so that RLP packets are produced. When RLP packets produced from one IP packet are transmitted to the application server through the base station, the following case sometimes occurs. The case is that when the transmission delay between a hand-off destination base station and Packet Data Serving Node (PDSN) which is an apparatus for accommodating the base station is shorter than that between a hand-off source base station and PDSN by a fixed time or more in case where the hand-off using RSP is applied, route change by RSP occurs on the way of transmitting RLP packets. In such a case, when the route change by RSP is made to perform hand-off, the order of packets received in PDSN cannot be maintained and the packets cannot be restored in PDSN, so that the packets are annulled.

It is an object of the present invention to provide a radio communication method, a radio mobile device and a radio base station accommodation apparatus which can restore packets certainly irrespective of network conditions such as transmission delay between a base station and PDSN.

According to the present invention, when a mobile device which performs hand-off using RSP changes a route, transmission control is made so that RLP packets produced from one IP packet do not spread over routes.

More particularly, in a radio communication system including at least one radio mobile device, a plurality of radio base stations and a radio base station accommodation apparatus to accommodate them and in which when hand-off of the radio mobile device is performed from a first radio base station to a second radio base station, sequence numbers of radio packets transmitted to the first radio base station and sequence numbers of radio packets transmitted to the second radio base station are managed independently, the radio mobile device controls to apply, when the hand-off is performed while transmission data is subjected to fragmentation to be divided into a plurality of radio packets and the plurality of radio packets are transmitted, sequence numbers of radio packets managed by the first radio base station to the plurality of fragmented radio packets even after the hand-off is performed and to apply sequence numbers of radio packets managed by the second radio base station to data transmitted subsequently after completion of transmission of the plurality of fragmented radio packets, and the radio base station accommodation apparatus identifies a radio base station managing radio packets on the basis of the sequence numbers managed in each radio base station and restores data for each radio base station.

According to the present invention, packets can be restored in PDSN irrespective of network conditions such as transmission delay between a base station and PDSN.

Other objects, features and advantages of the invention will become apparent from the following description of the embodiments of the invention taken in conjunction with the accompanying drawings.

DESCRIPTION OF THE EMBODIMENTS

There is described an embodiment of the present invention to which a hand-off method to which RSP according to the present invention is applied in 1xEV-DO network is applied.

Figure 1:
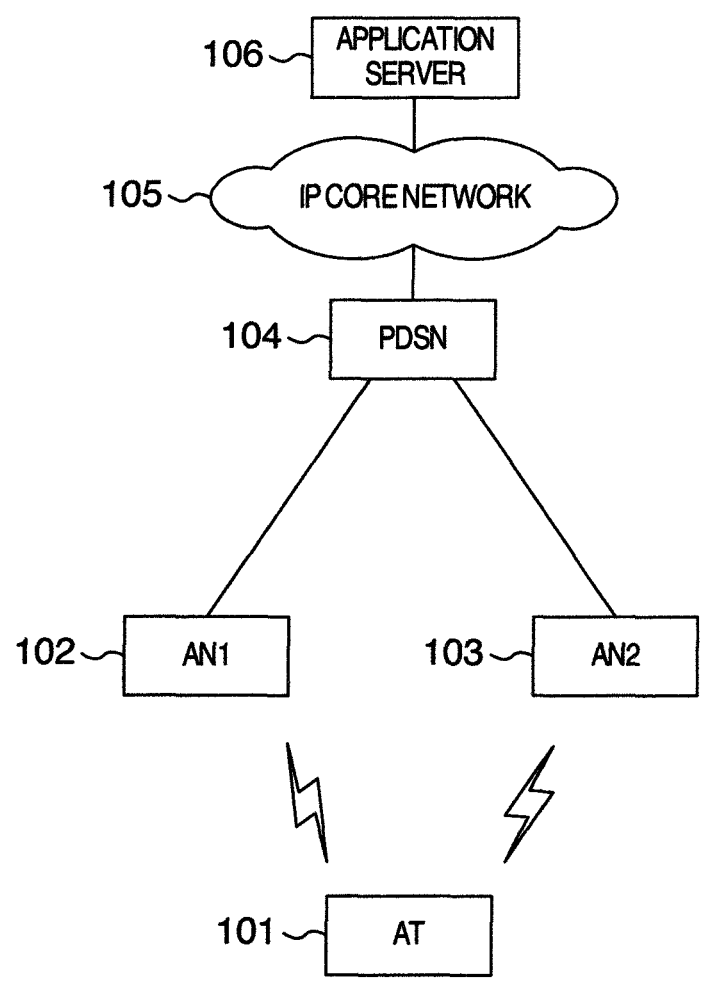
FIG. 1 is a schematic diagram illustrating the whole configuration of 1xEV-DO system to which the present invention is applied.

FIG. 1 schematically illustrates the whole configuration of CDMA 2000 1xEV-DO network to which the present invention is applied. An access terminal (AT) 101 is communicating with access networks (AN) 102 and 103. The AN1 and AN2 can each receive radio waves from AT and can restore packet data transmitted from AT. Furthermore, AN1 and AN2 transmit the restored packet to PDSN 104. PDSN 104 transmits the packet received from AN1 (102) or AN2 (103) through IP (Internet Protocol) core network 105 to an application server 106. In this manner, data communication between AT 101 and application server 106 is realized.

In the above description, AT corresponds to a radio mobile device, ANs radio base stations and PSDN a radio base station accommodation apparatus.

Figure 2:
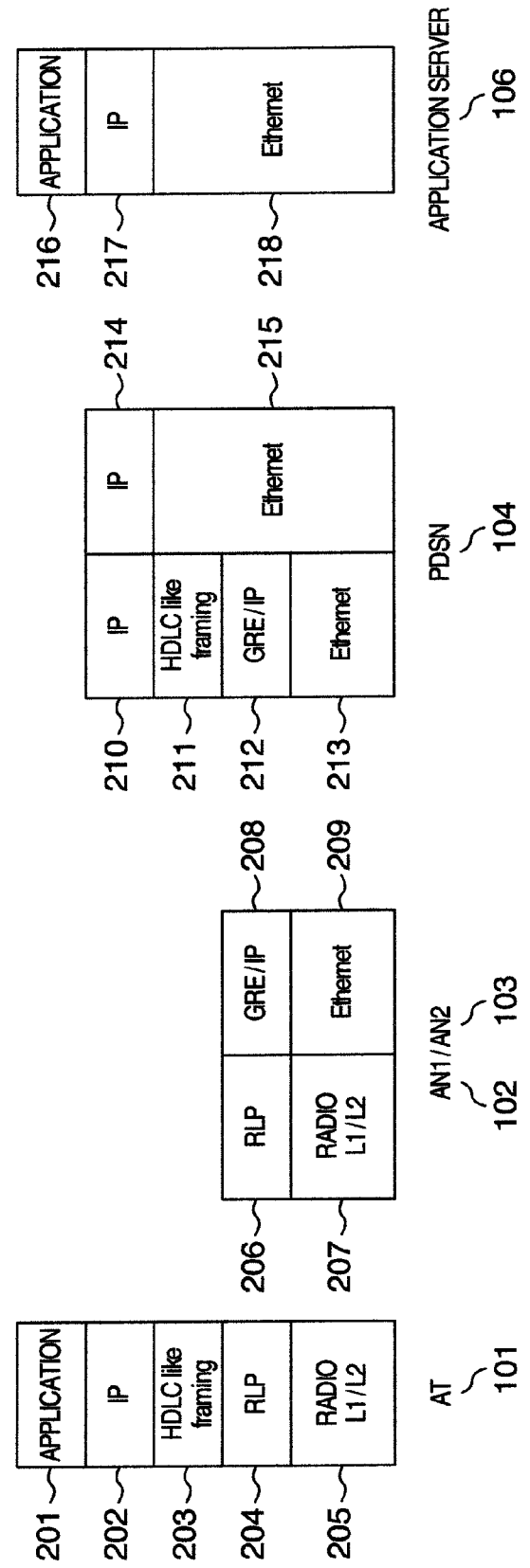
FIG. 2 is a diagram illustrating protocol stacks of transmission data in an embodiment of the present invention.

FIG. 2 shows protocol stacks applied to data transmission from the mobile device to the application server. More particularly, FIG. 2 shows the protocol stacks applied when data is transmitted from AT 101 to the application server 106.

When an application 201 of AT 101 transmits data, IP packet is produced by IP stack 202 and is framed by HDLC like framing stack 203. The framed packet is fragmented into a plurality of packets having the packet size suitable for radio transmission by means of RLP layer 204 and the packets are assigned sequence numbers and the like. The packets are radio-modulated by radio L1/L2 layer 205 to be transmitted to AN1 (102) or AN2 (103).

Radio waves transmitted from AT are received and demodulated by radio L1/L2 layer 207 in AN1 (102) or AN2 (103) and RLP packets are delivered to RLP layer 206. The packets are GRE-capsuled by GRE/IP layer 208 and transmitted to PDSN 104 by Ethernet (trademark) 209.

PDSN 104 decapsules GRE/IP packets received by Ethernet 213 by means of GRE/IP layer 212 and delivers the packets to HDLC like framing layer 211. The packets are deframed in HDLC like framing layer 211 and delivered to IP layer 210. The IP packets are transmitted to the application server 106 by IP layer 214 using Ethernet 215. The packets received by Ethernet 218 of application server 106 are processed by IP layer 217 to be delivered to the application 216.

Figure 3:
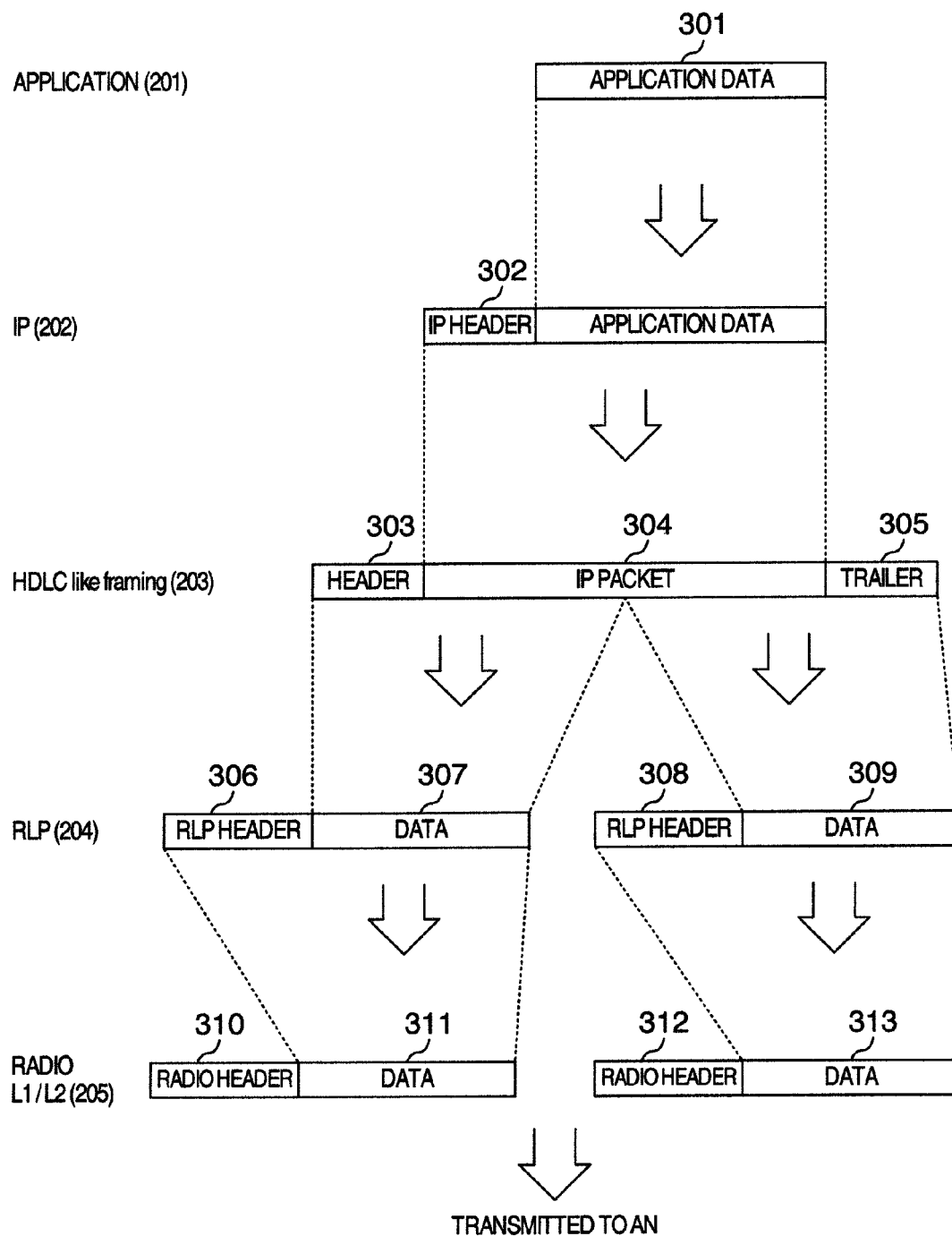
FIG. 3 is a diagram illustrating transfer processing of up packet in an access terminal (AT)

FIG. 3 is a diagram illustrating transfer processing of up packets transmitted from AT.

Application data 301 produced by application 201 is delivered to IP; layer 202. The data is assigned IP header 302 in IP; layer 202 and is then delivered to HDLC like framing layer 203. The data is assigned header 303 and trailer 305 in HDLC like framing layer and is then framed to be delivered to RLP layer 204. The data is fragmented to have the data size suitable for radio transmission in RLP layer 204. In FIG. 3, the data received from HDLC like framing layer is divided into two RLP packets. That is, the data is divided into two RLP packets including one having RLP header 306 and data 307 and the other having RLP header 308 and data 309. Both of RLP packets are delivered to radio L1/L2 (layer 1/layer 2) 205 and assigned radio headers 310 and 312, respectively, to be transmitted to AN.

Figure 4:
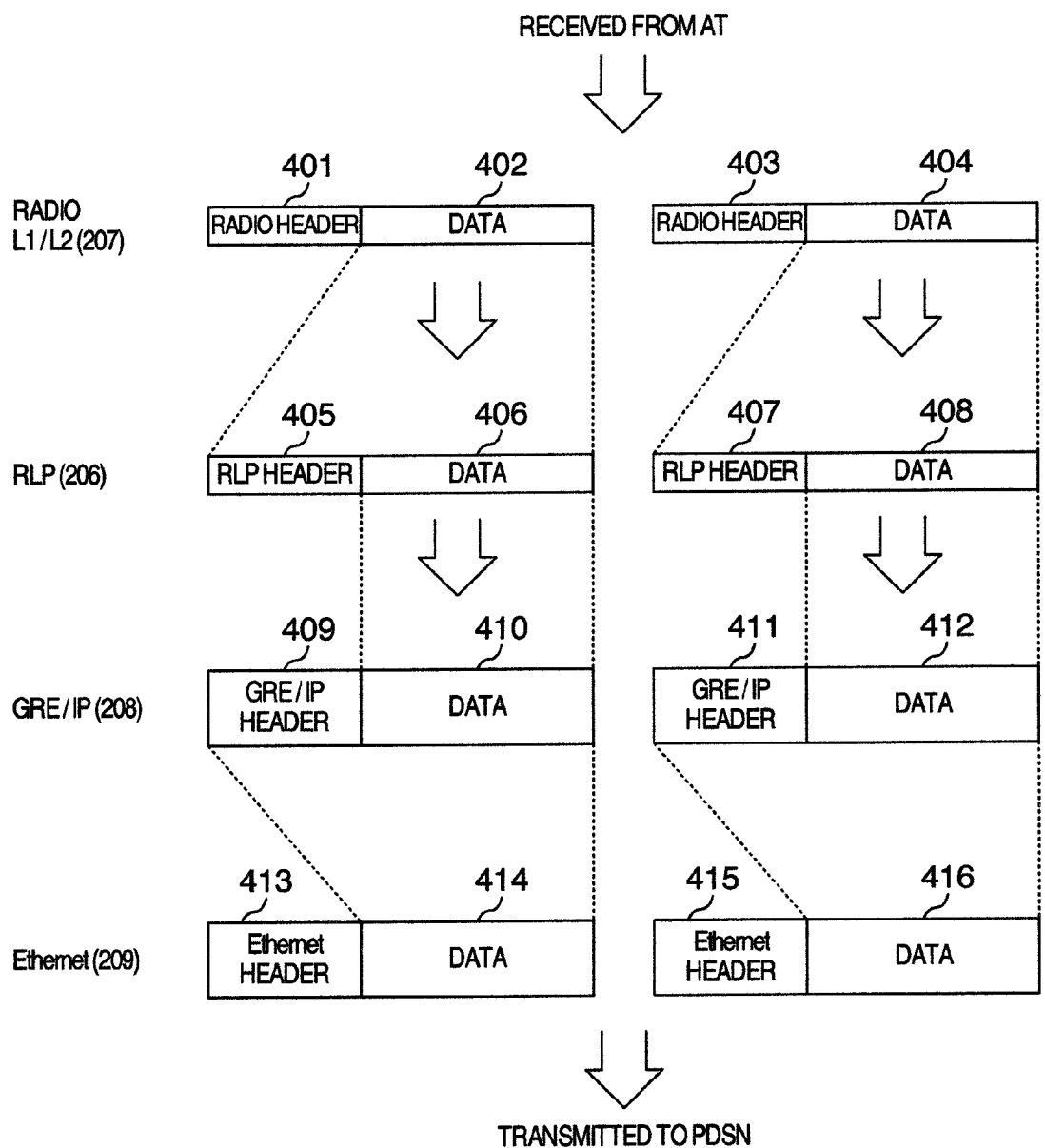
FIG. 4 is a diagram illustrating receiving and transfer processing of packet in an access network (AN)

FIG. 4 is a diagram illustrating processing for transmitting data received from AT in AN to PDSN.

When radio L1/L2 207 receives the radio packets from AT, the radio L1/L2 removes radio headers 401 and 403 therefrom and delivers the packets to RLP layer 206. RLP layer 206 removes RLP headers 405 and 407 from the packets and delivers the packets to GRE/IP layer 208. GRE/IP layer 208 assigns GRE/IP headers 409 and 411 to the packets and Ethernet layer 209 assigns Ethernet headers 413 and 415 thereto to be transmitted to PDSN.

Figure 5:
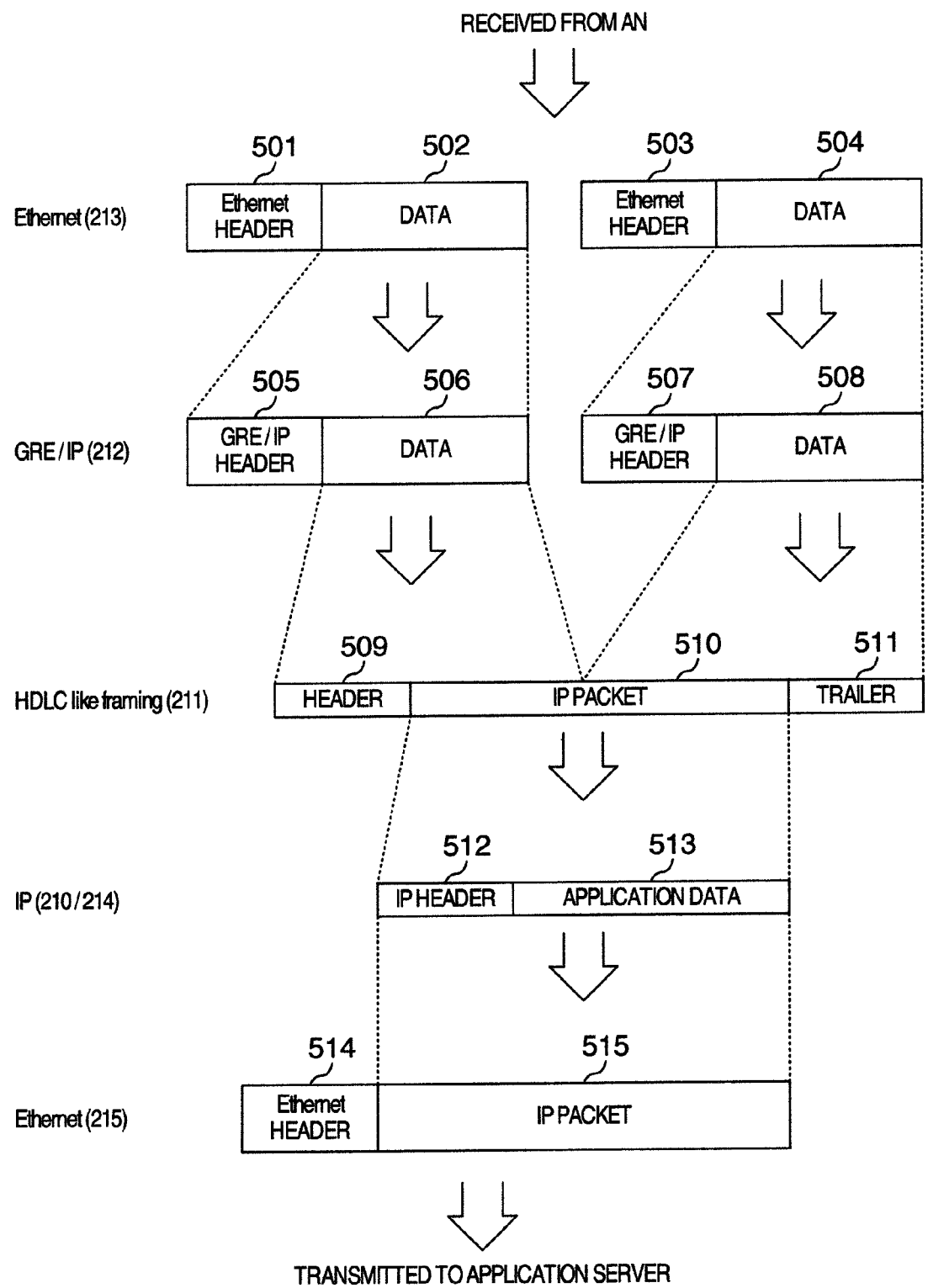
FIG. 5 is a diagram illustrating receiving and transmitting processing of packet in PDSN.

FIG. 5 is a diagram illustrating processing for transmitting data received from AN in PDSN to the application server.

When Ethernet layer 213 receives the data from AN, the Ethernet layer removes Ethernet headers 501 and 503 therefrom and delivers the data to GRE/IP layer 212. GRE/IP layer 212 removes GRE/IP headers 505 and 507 from the data and delivers the data to HDLC like framing layer 211. HDLC like framing layer 211 combines packets divided plurally to restore one packet composed of header part 509, IP packet part 510 and trailer part 511. The packet is delivered to IP layers 210 and 214 and further delivered to Ethernet layer 215. In Ethernet layer 215, the packet is assigned Ethernet header 514 to be transmitted to the application server.

Figure 6:
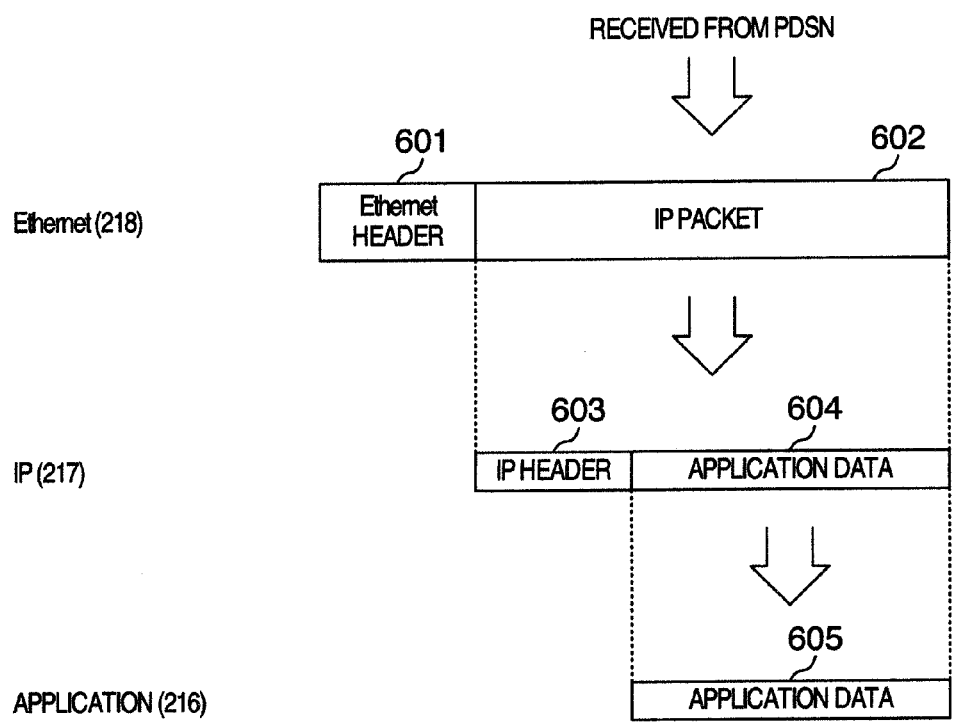
FIG. 6 is a diagram illustrating receiving processing in an application server.

FIG. 6 is a diagram illustrating processing for delivering data received from PDSN in the application server to the application.

Ethernet header 601 of the packet received from PDSN is removed in Ethernet layer 218 and the packet is delivered to IP layer 217. IP layer 217 removes IP header 603 therefrom to be delivered to the application 216.

As shown in FIGS. 3 to 6, data transmitted from AT to the application server is framed by HDLC like framing and is then divided into the plurality of packets in order to produce RLP packets suitable for radio transmission. The divided packets are combined by HDLC like framing of PDSN to be transmitted to the application of the application server finally.

Figure 7:
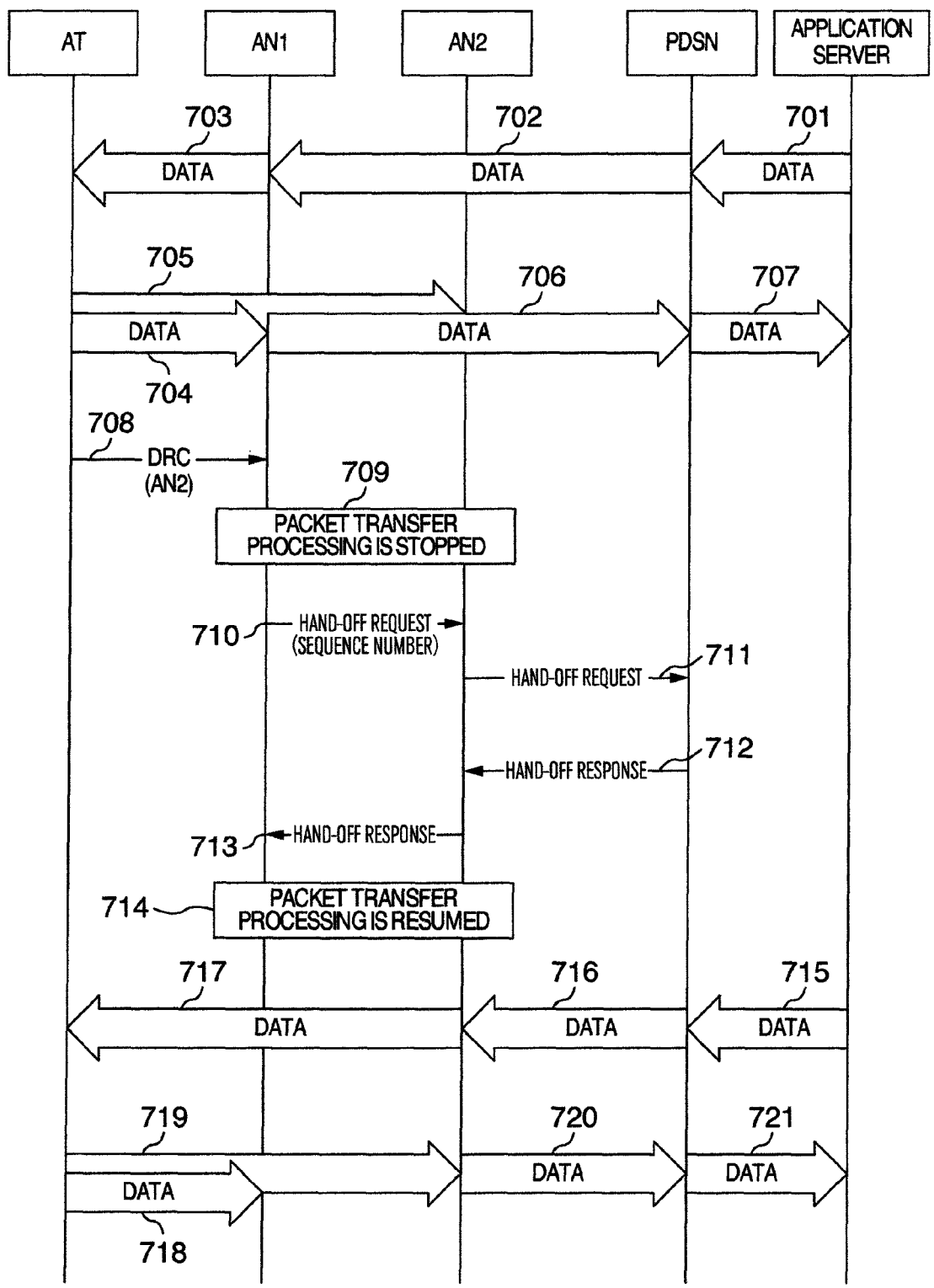
FIG. 7 is a sequence diagram illustrating hand-off processing in a prior art.

FIG. 7 is a sequence diagram illustrating processing of a hand-off method in a prior art.

FIG. 7 shows the processing in case where AT is moved from AN1 to AN2. Down data transmitted from application server to AT is first transmitted from application server to PDSN (701) and then transmitted from PDSN to AN1 (702) and finally transmitted from AN1 to AT (703). In up data transmitted from AT to application server, data transmitted from AT is first received by both of AN1 and AN2 (704, 705). Since AN1 is an anchor AN which terminates down data, AN1 transmits data received from AT to PDSN (706). Data 705 received by AN2 from AT is generally transferred to AN1 for the purpose of upward selection and combination, although omitted in the drawing. AN2 does not transmit data to PDSN.

In such situation, the hand-off for making the AT receive down data from AN2 is performed. At this time, AT transmits a control signal named Data Rate Control (DRC) to AN1 (708). The DRC contains information indicating AN2 as down-data transmission change destination. AN1 stops packet transmission processing for both of down data and up data (709). The reason thereof is that the sequence number of data (RLP packet) transmitted from AN1 to AT and the sequence number of data (RLP packet) transmitted from AT to AN1 are required to be taken over to AN2 and when data processing is performed during taking over, the sequence number being used by AT does not coincide with the sequence number to be used by AN2. AN1 transmits a hand-off request signal to AN2 in order to change the flow of data to AN2 (710). The hand-off request signal contains the sequence numbers of RLP packets used by AT and AN1. AN2 transmits the hand-off request signal to PDSN (711) to request PDSN to change the down data transmission destination from AN1 to AN2. PDSN transmits a hand-off response signal to AN2 and informs AN2 that the hand-off request signal is processed normally and down data is started to be transmitted to AN2. AN2 transmits a hand-off response to AN1 (713) and informs AN1 that hand-off receiving preparation has been arranged. AN2 uses RLP sequence number received from AN1 to complete preparation for data transfer and resumes the packet transfer processing (714).

By performing the above processing, the down data 715 transmitted from application server to PDSN is transmitted through PDSN to AN2 (716) and further transmitted to AT by radio (717). The up data transmitted from AT is received by AN1 and AN2 (718, 719). Since AN2 is an anchor AN which terminates the down data, AN2 transmits data received from AT to PDSN (720). The data 718 received by AN1 from AT is generally transferred to AN2 for the purpose of upward selection and combination, although omitted in the drawing. AN1 does not transmit data to PDSN.

As described above, since the hand-off method in the prior art requires to take over the RLP sequence numbers when the hand-off is performed, data communication cannot be made during taking over of data, so that a stop period of packet transfer processing occurs. Consequently, delay and jitter occur due to it and a large problem arises in case where an application of a real-time system such as particularly VoIP is processed.

Figure 8:
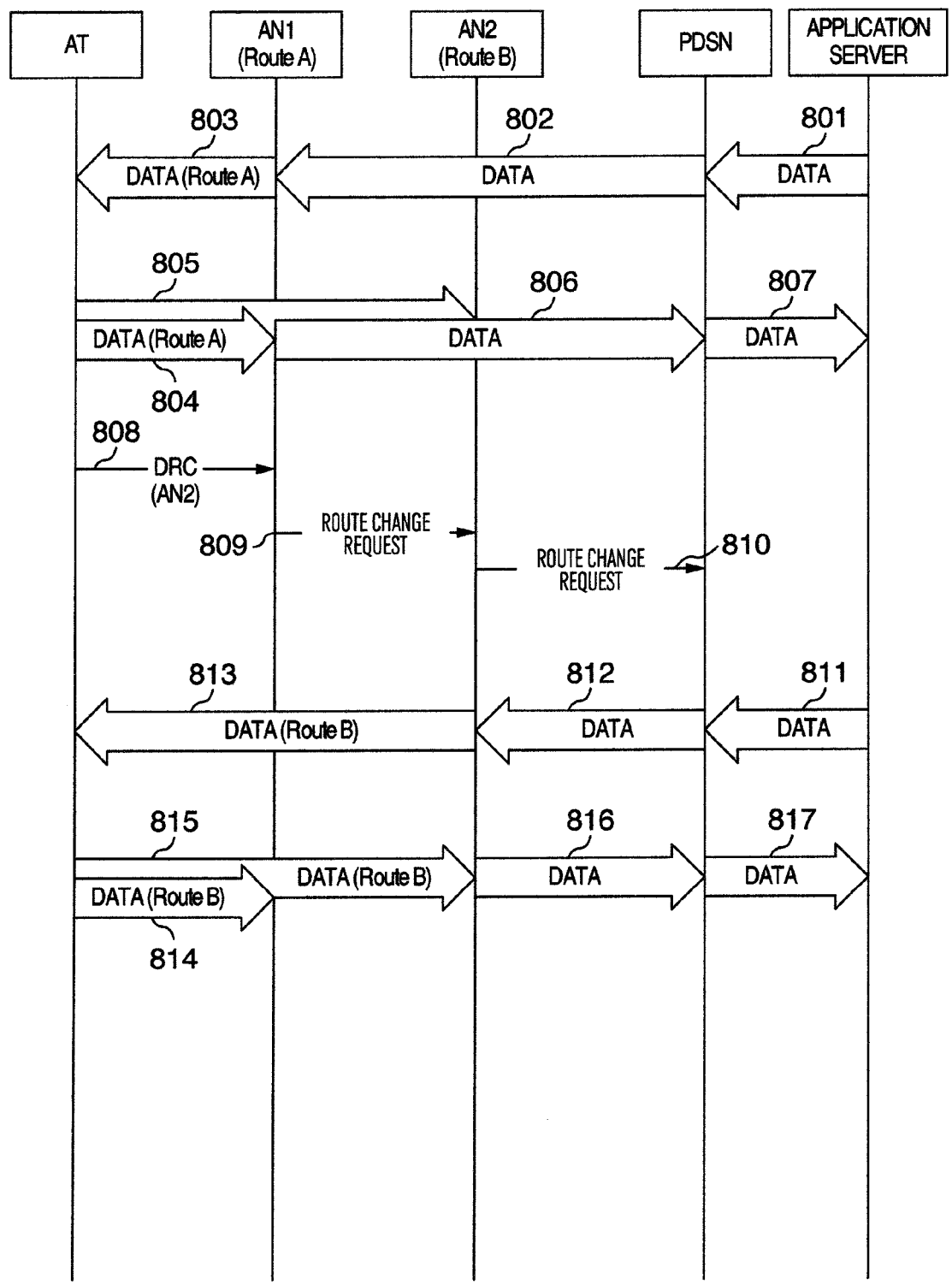
FIG. 8 is a sequence diagram illustrating hand-off processing when RSP is applied.

FIG. 8 is a sequence diagram illustrating a flow of processing of the hand-off method in case where RSP is applied thereto.

FIG. 8 shows an example of the processing in case where AT is moved from AN1 to AN2.

In this processing, RSP is applied and it is supposed that AN1 of hand-off source manages RLP by Route A and AN2 of hand-off destination manages RLP by Route B. RLPs in the respective routes manage the sequence numbers independently and accordingly even when the hand-off is performed, it is not necessary to take over the sequence numbers. Down data from the application server to AT is first transmitted from the application server to PDSN (801), then transmitted from PDSN to AN1 (802) and finally transmitted from AN1 to AT (803).

Since AN1 manages RLP by Route A, the RLP packet transmitted from AN1 to AT indicates that it is a packet for Route A. In up data transmitted from AT to the application server, data transmitted from AT is received by both of AN1 and AN2 (804, 805). Since data transmitted from AT is being in communication using Route A, the data contains information indicating that it is packet for Route A. Since AN1 which has received the packet for Route A recognizes that it is packet data for Route managed by AN1 itself, that is, packet for Route A, AN1 receives the data and transmits the data to PDSN (806). On the other hand, similarly, AN2 also receives packet for Route A from AT, although since it is not packet data for Route managed by AN2 itself, that is, packet for Route B, AN2 does not transmit the received data to PDSN and annuls it. PDSN transmits data 806 received from AN1 to the application server (807).

In such situation, the hand-off for making AT receive down data from AN2 is performed. At this time, AT transmits a control signal named Data Rate Control (DRC) to AN1 (808). DRC contains information indicating AN2 as down-data transmission change destination. The hand-off to which RSP is applied is different from the hand-off to which RSP is not applied as described in FIG. 7 and is not required to stop packet transmission processing of up data and down data. The reason thereof is that RLPs for hand-off source and hand-off destination can be operated independently by RSP and it is not necessary to take over the sequence numbers. Accordingly, AN1 transmits a route change request (809) to AN2 without interrupting data transmission processing. AN2 transmits the route change request (810) to PDSN and requires to change down-data transmission destination from AN1 to AN2. PDSN changes the down-data transmission destination to AN2 in response to the request.

After this, down data 811 from the application server transmits to AN2 through PDSN (812). The data is further transmitted from AN2 to AT (813). Since AN2 manages RLP by Route B, RLP packet transmitted from AN2 to AT indicates that it is packet for Route B. When AT receives the packet for Route B, AT changes the route so that up data transmitted from AT to AN also uses packet for Route B. The up data transmitted from AT is received by AN1 and AN2 (814, 815). Data transmitted from AT contains information indicating that it is packet for Route B since the data is being in communication using Route B. Since AN2 which has received the packet for Route B understands that the received packet is packet data for Route managed by AN2 itself, that is, packet for Route B, AN2 performs receiving processing and transmits the data to PDSN (816). On the other hand, AN1 also receives the packet for Route B from AT similarly, although since the received packet is not packet data for Route managed by AN1 itself, that is, packet for Route A, the received data is not transmitted to PDSN and is annulled. PDSN transmits data 816 received from AN2 to the application server (817).

Figure 9:
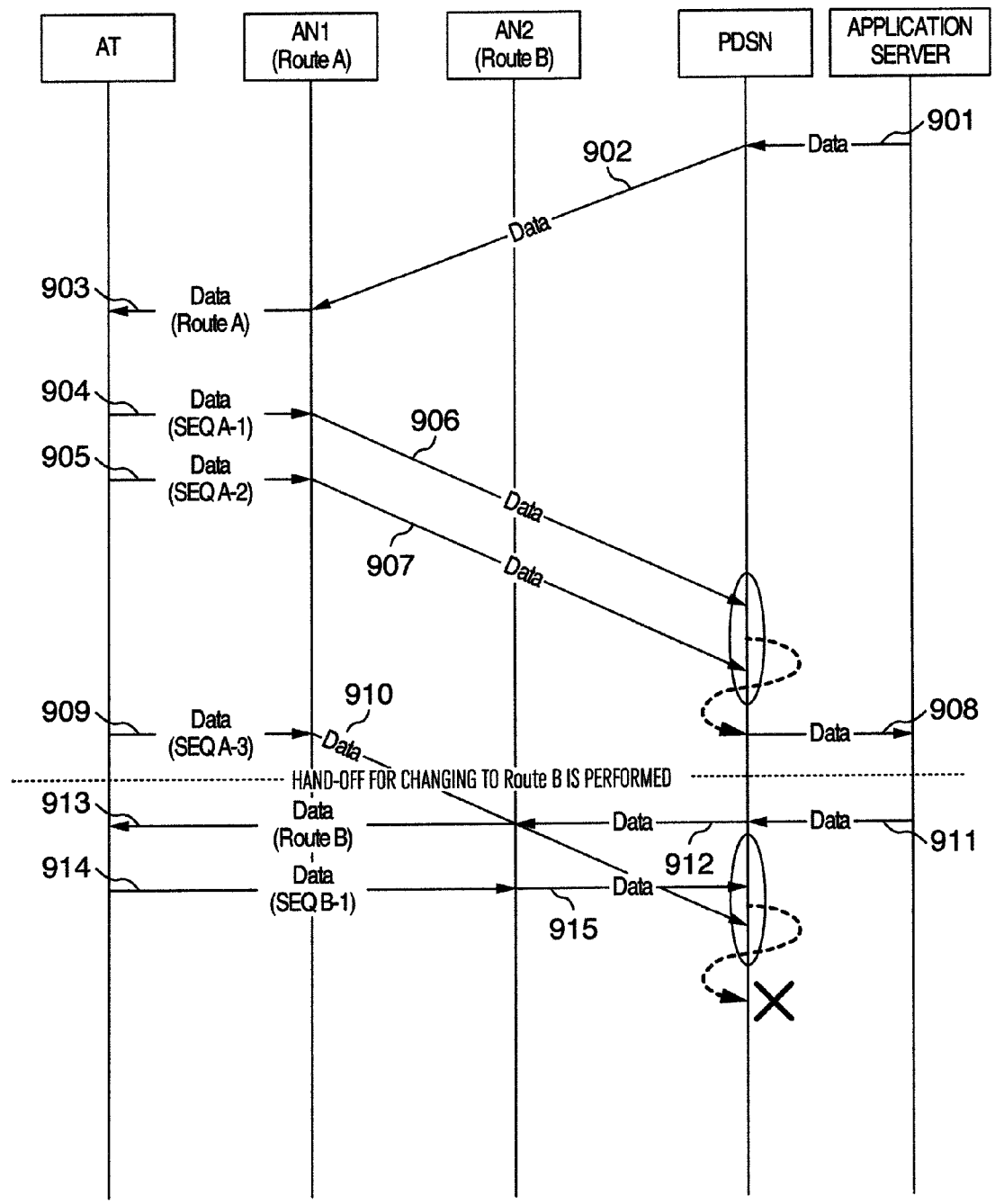
FIG. 9 is a diagram illustrating a flow of data upon change of up route.

FIG. 9 is a sequence diagram illustrating a problem which can arise upon route change of up transmission data in the hand-off to which RSP is applied.

In this example, AN1 manages RLP by Route A and AN2 manages RLP by Route B. Furthermore, the case where the transmission delay between PDSN and AN1 is longer than that between PDSN and AN2 is shown. On such conditions, the procedure of performing the hand-off for changing a data communication route to AN2 during communication between AT and AN1 is now described.

Down data 901 transmitted from the application server is received by PDSN and then transmitted to AN1 (902). With regard to data 902 transmitted from PDSN to AN1, the drawing shows that the transmission delay between PDSN and AN1 is large and accordingly it takes delay to receive the data by AN1 after the data is transmitted by PDSN. Since AN1 is the base station which manages Route A, AN1 produces packet for Route A and transmits it to AT (903). Since AT receives packet for Route A from down data, AT transmits packet for the same Route A even in the up direction when the AT transmits up data. It is supposed that one packet produced by application of AT is divided into two RLP packets to be transmitted to AN1. In other words, two data 904 and 905 constitute one IP packet and are assigned sequence numbers 1 and 2, respectively, as RLP packets for Route A to be transmitted to AN1. When AN1 receives the packets, AN1 transmits the packets to PDSN (906, 907). When PDSN receives the two packets 906 and 907, the packets are deframed by HDLC like framing to produce one IP packet and PDSN transmits data to the application server (908).

Similarly, AT divides one packet produced by application into two RLP packets and starts to transmit the packets to AN1, although it is supposed that the hand-off for changing to Route B is performed when only one of the two packets is transmitted. Accordingly, when AT transmits the first packet of two RLP packets produced from one packet produced by application as packet for Route A (909), the hand-off for changing to Route B is performed and down packet 911 from the application server is transmitted through PDSN to AN2 (912) and packet for Route B is transmitted to AT (913). When AT receives the packet, AT transmits up data as packet for Route B (914). The first RLP packet produced from one packet is transmitted to AN1 and further transmitted to PDSN (910). The packet arrives at PDSN late due to the transmission delay produced between AN1 and PDSN.

On the other hand, the second RLP packet is transmitted to AN2 and further transmitted to PDSN (915). PDSN receives the packet 915 from AN2 and the packet 910 from AN1 in order of description and accordingly PDSN cannot make deframing by HDLC like framing normally, so that PDSN annuls the packets.

Figure 10:
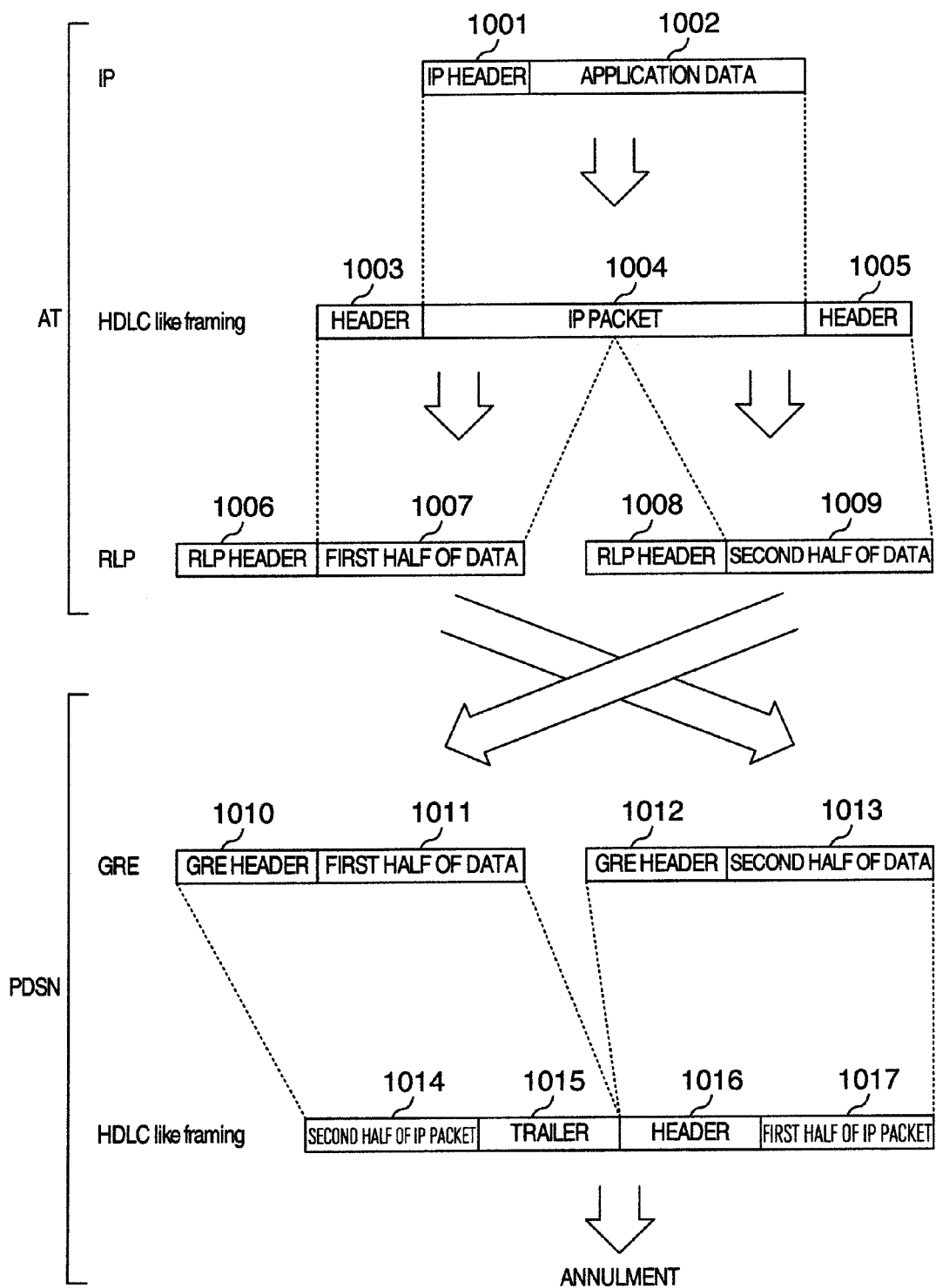
FIG. 10 is a sequence diagram illustrating a problem upon change of up route.

FIG. 10 is a diagram illustrating annulment of packets in PDSN due to change or replacement of packets.

IP packet (composed of IP header denoted by 1001 and application data denoted by 1002) produced by AT is subjected to HDLC like framing, so that header 1003 and trailer 1005 are added thereto. The packet is fragmented into two RLP packets having the packet size suitable for radio transmission. The first RLP packet includes RLP header 1006 and first half part 1007 of data and the second RLP packet includes RLP header 1008 and second half part 1009 of data.

When the order of the two RLP packets is changed and GRE/IP packets arrive at PDSN, packet including GRE header 1010 and second half part 1011 of data arrives as first GRE/IP packet and packet including GRE header 1012 and second half part 1013 of data arrives as second GRE/IP packet.

In HDLC like framing processing in PDSN, the two packets are combined, although data is not restored due to change of data order of packets, so that the packets are annulled.

Figure 11:
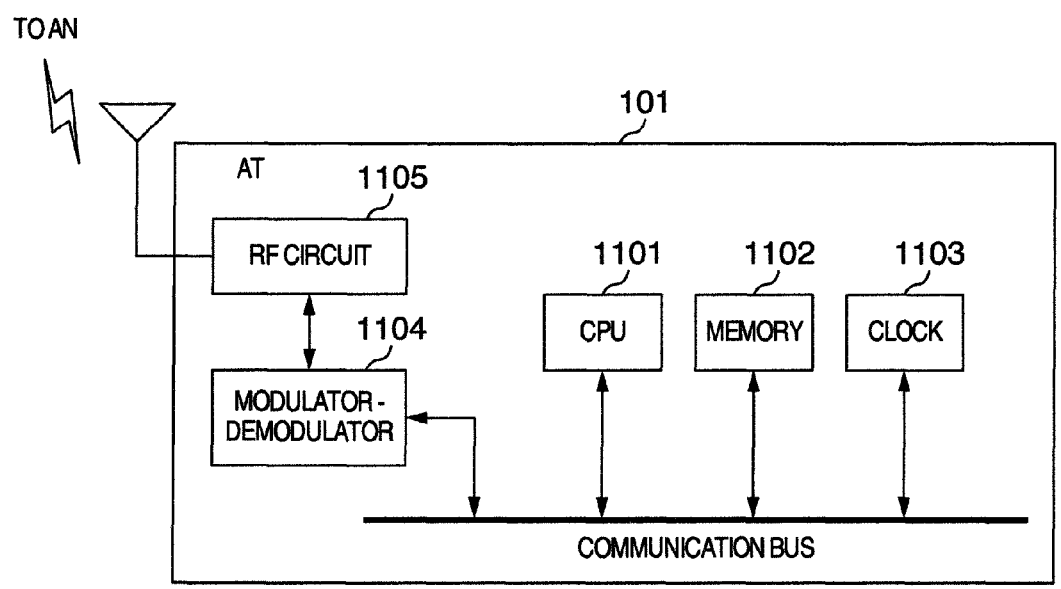
FIG. 11 is a schematic diagram illustrating hardware configuration of AT in an embodiment of the present invention.

FIG. 11 is a schematic diagram illustrating hardware configuration of AT in an embodiment of the present invention.

AT 101 includes a central processing unit (CPU) 1101, a memory 1102 and a clock 103, which are connected to a communication bus. The CPU 1101 subjects data to be transmitted to production processing of RLP packet described in the embodiment of the present invention and the data is once stored in the memory 1102. Thereafter, the data is read out from the memory by a modulator-demodulator circuit 1104 and is modulated. After modulation, the data is converted into radio data by an RF circuit and is transmitted to AN.

Figure 12:
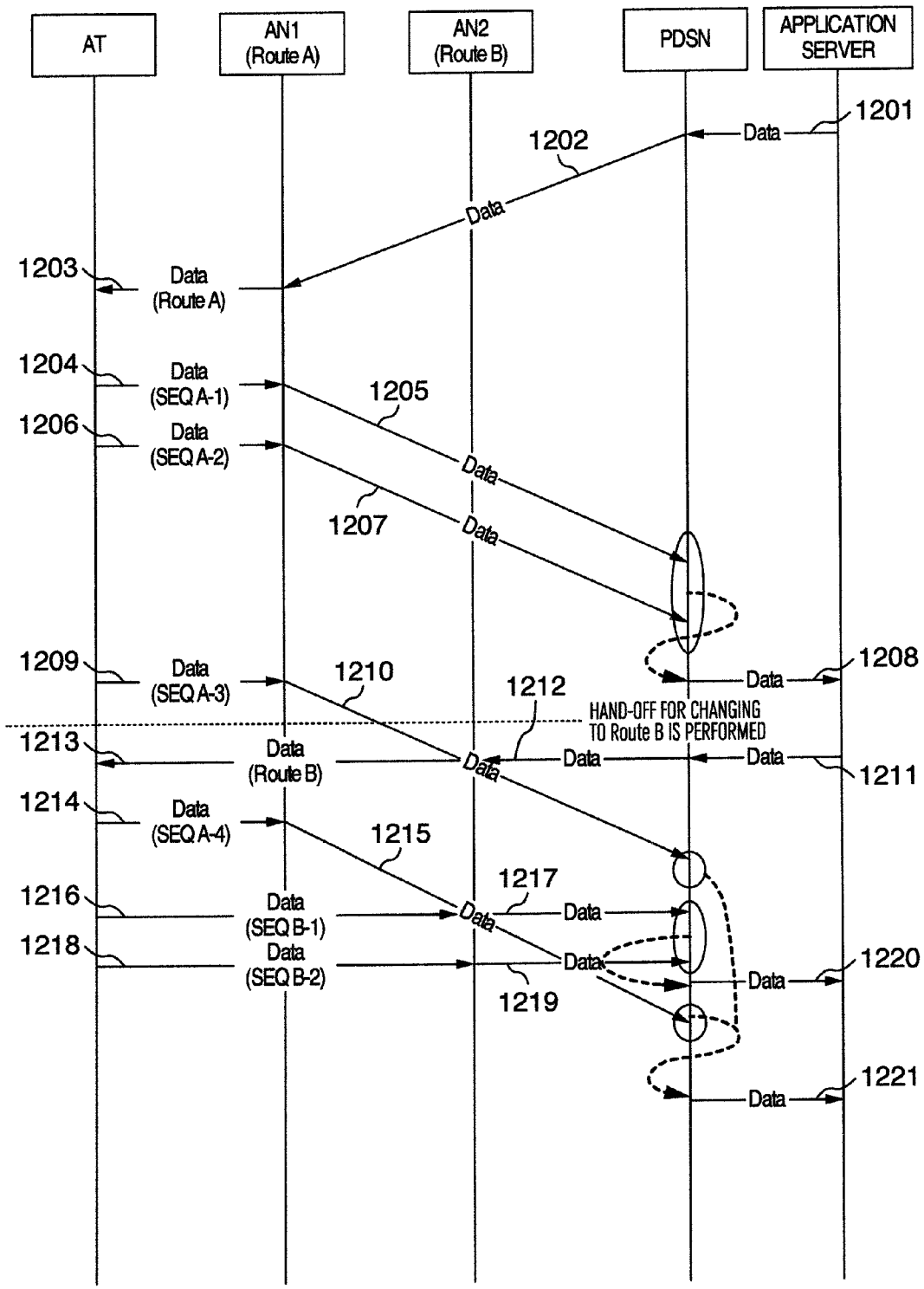
FIG. 12 is a sequence diagram illustrating a flow of data after AT transmission control in an embodiment of the present invention.

FIG. 12 is a sequence diagram illustrating a flow of data in case where transmission control of the present invention is performed.

As shown in FIG. 12, in the present invention, RLP packets produced from one IP packet are controlled not to spread over routes and not to be transmitted upon change of route by AT. An embodiment for preventing annulment of packets in PDSN by making control as above is now described in detail.

First, data 1201 transmitted from the application server in the down direction is transmitted through PDSN to AN1 (1202). AN1 manages RLP by Route A and packet transmitted by AN1 to AT contains information indicating that it is packet for Route A (1203). AT receives packet for Route A from down data and accordingly when AT transmits up data, AT transmits packet for the same Route A even in the up direction. In the embodiment, it is supposed that one packet produced by application of AT is divided into two RLP packets to be transmitted to AN1. That is, it is supposed that two data 1204 and 1206 constitute one IP packet and the two data are assigned sequence numbers 1 and 2, respectively, as RLP packets for Route A to be transmitted to AN1. When AN1 receives the packets, AN1 transmits the packets to PDSN (1205, 1207). When PDSN receives the two packets 1205 and 1207, PDSN subjects the packets to deframing by HDLC like framing to produce one IP packet and transmits the data to the application server (1208).

Similarly, AT divides one packet produced by application into two RLP packets to be transmitted to AN1, although when only one of the two packets has been transmitted, the hand-off for changing to Route B is performed and down packet 1211 from the application server is transmitted through PDSN to AN2 (1212), so that packet for Route B arrives at AT (1213). Accordingly, first RLP packet produced from one packet is transmitted to AN1 (1209) and further transmitted to PDSN (1210). It takes time for the packet to reach PDSN due to the transmission delay occurring between AN1 and PDSN. In this connection, in the prior art method, the second RLP packet 1214 is transmitted to AN2 as packet for Route B since change to Route B has been made, although the packet 1214 is transmitted to AN1 as packet for Route A. This packet is transmitted from AN1 to PDSN (1215). It also takes time for the packet 1215 to reach PDSN due to the transmission delay occurring between AN1 and PDSN.

After transmission of the packet 1214, when AT transmits next IP packet, AT transmits the packet using changed Route B. That is, two RLP packets 1216 and 1218 produced from one IP packet are transmitted to AN2 as packets for Route B. When the transmission delay between AN2 and PDSN is short, the packets reach PDSN immediately (1217, 1219).

PDSN receives packet 1210 from AN1, packet 1217 from AN2, packet 1219 from AN2 and packet 1215 from AN1 in order of description, although the packets are subjected to deframing processing by HDLC like framing for each AN, so that IP packet can be restored from packets 1210 and 1215 to be transmitted to the application server as data 1221. Furthermore, IP packet can be also restored from packets 1217 and 1219 to be transmitted to the application server as data 1220. At this time, the transmission order of the packets 1220 and 1221 is different from the order of production in AT, although reversal of the order can be processed properly by the application server because of change or replacement of IP packet unit.

Figure 13:
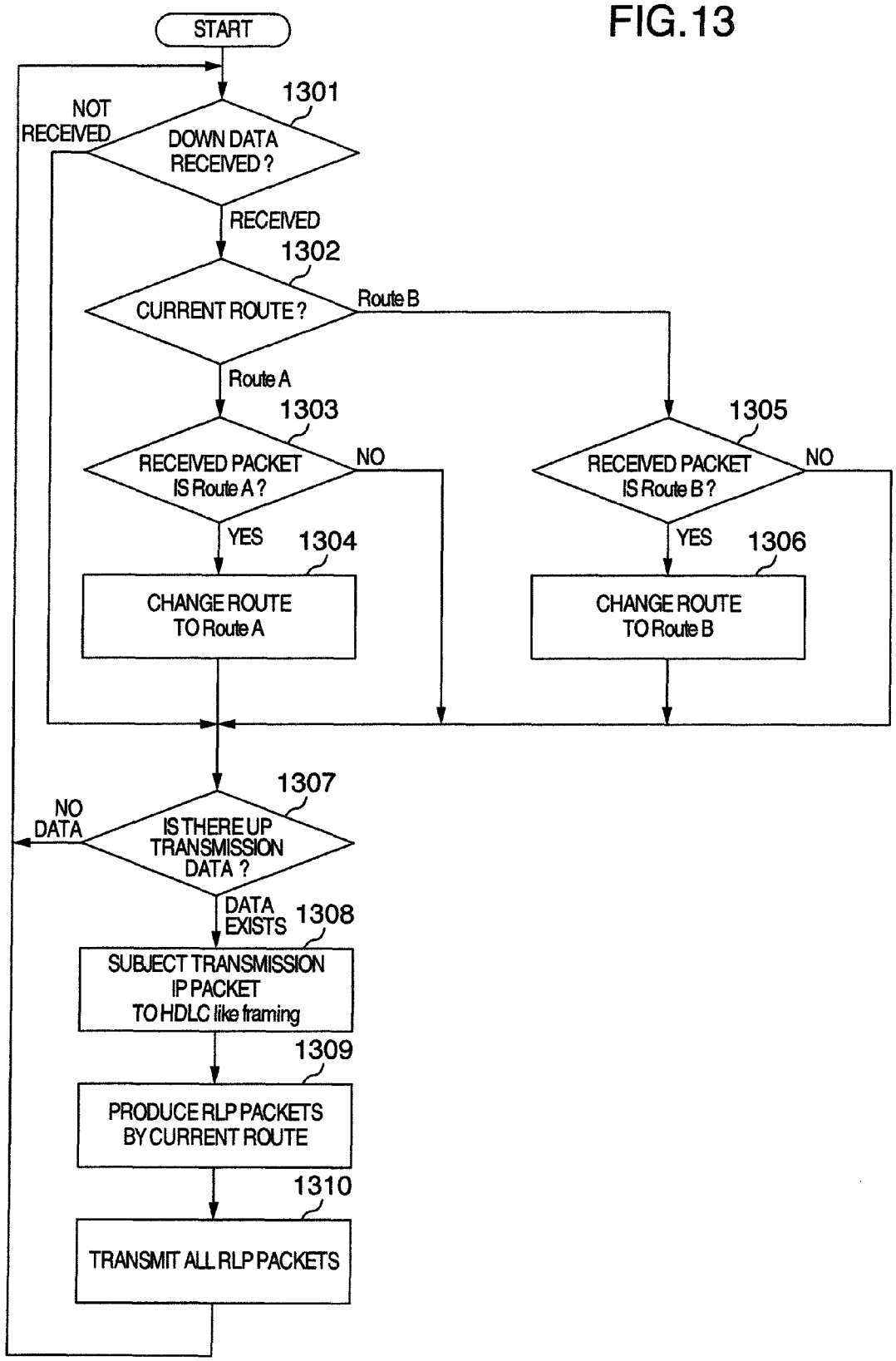
FIG. 13 is a flow chart showing transmission control in AT in an embodiment of the present invention.

FIG. 13 is a flow chart showing transmission control of AT in the present invention. When AT receives down data (1301), AT confirms route which is applied currently (1302). When the route applied currently is Route A and the received packet is Route B (1303), the applied route is changed to Route B (1304). When the received packet is Route A, the applied route is left to be Route A. When the route applied currently is Route B and the received packet is Route A (1305), the applied route is changed to Route A (1306). When the received packet is Route B, the applied route is left to be Route B.

In such state, when there is up transmission data (1307), the transmission IP packet is subjected to HDLC like framing (1308) and RLP packets are produced by the current applied route (1309). All the RLP packets produced from one transmission packet are transmitted using the same route (1310).

Figure 14:
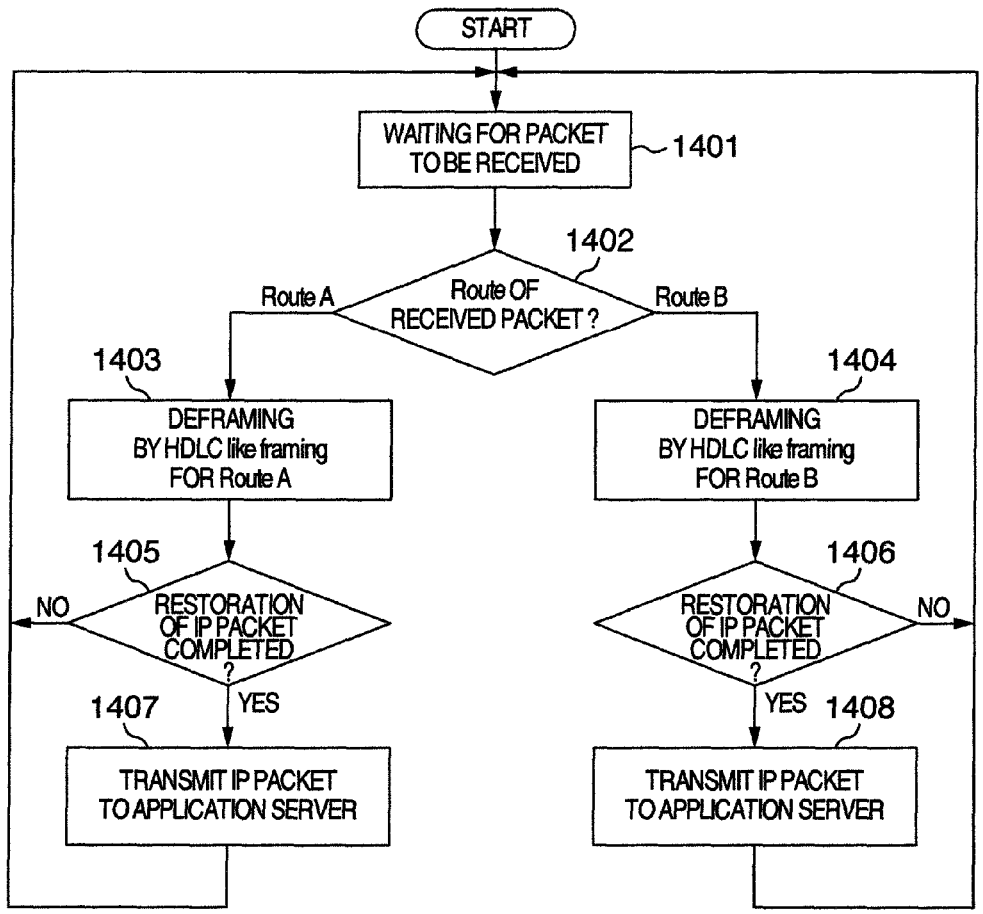
FIG. 14 is a flow chart showing receiving control in PDSN in an embodiment of the present invention.

FIG. 14 is a flow chart showing receiving control in PDSN in the present invention.

When PDSN receives up data (1401), PDSN judges route of the received packet (1402). The route is judged on the basis of whether the packet is received from the AN for Route A or B. When the packet for Route A is received, the packet is subjected to deframing by HDLC like framing for Route A (1403). When the packet for Route B is received, the packet is subjected to deframing by HDLC like framing for Route B (1404). When restoration of the respective IP packets is completed (1405, 1406), the restored IP packets are transmitted to the application server (1407, 1408). When restoration of IP packets is not completed, the packets are not transmitted to the application server and PDSN waits for packet to be received.

Figure 15:
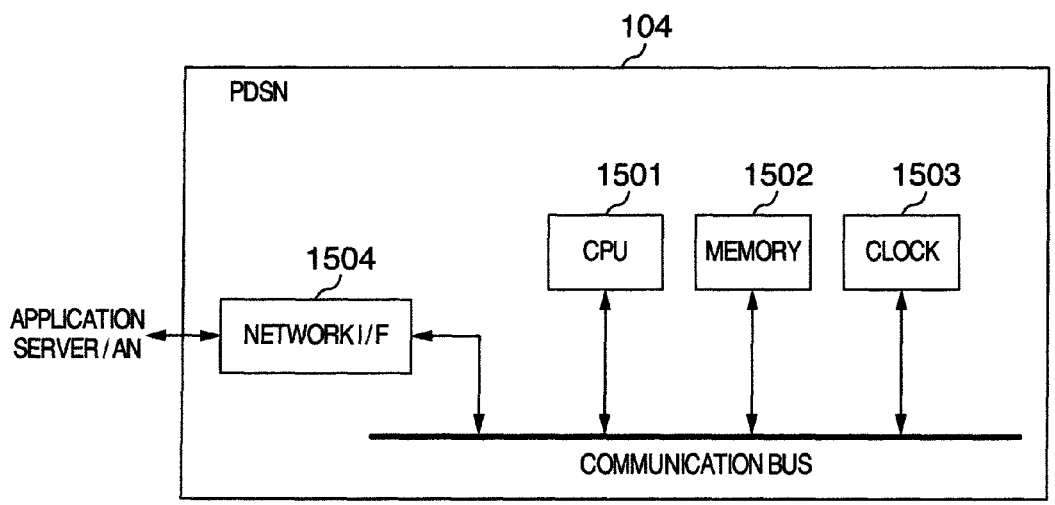
FIG. 15 is a schematic diagram illustrating hardware configuration of PDSN in an embodiment of the present invention.

FIG. 15 is a schematic diagram illustrating hardware configuration of PDSN in an embodiment of the present invention. PDSN 104 includes a central processing unit (CPU) 1501, a memory 1502 and a clock 1503, which are connected to a communication bus. Data to be transmitted and received from other devices is subjected to packet production processing of the present invention by CPU 1501 and once stored in memory 1502. Then, the data is transmitted through a network interface (I/F) 1504 to the application server or AN.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radio communication method in a radio communication system including at least one radio mobile device, a plurality of radio base stations and a radio base station accommodation apparatus to accommodate them, the radio communication method comprising:
    handling first-route sequence numbers of radio packets transmitted to a first radio base station and second-route sequence numbers of radio packets transmitted to a second radio base station, of the radio communication system, independently through a Route Selection Protocol (RSP);
    fragmenting an application packet of an up direction from the radio mobile device, into a plurality of packets each having a packet size suited for transmission in the radio communication system;
    performing instantaneous hand-off of the radio mobile device from a first radio base station to a second radio base station, irrespective of transmission status of any plurality of packets of any application packet, where a management of the sequence numbers of radio packets in the radio base station is performed using Radio Link Protocol (RLP) packets each of which includes a RLP header and a part of data;
    in the event that the radio mobile device had transmitted only a portion of the plurality of RLP packets of a subject application packet to the first radio base station using the first-route sequence numbers which were used prior to the hand-off,
    making: the radio mobile device control to transmit a remainder of the plurality of RLP packets of the subject application packet to the first radio base station using the first-route sequence numbers after the hand-off is performed; and the radio mobile device control to apply second-route sequence numbers handled by the second radio base station to fragmented radio packets of a next application packet having all radio packets thereof transmitted only to the second radio base station, and transmit the fragmented radio packets of the next application packet to the second radio base station; and
    making the radio base station accommodation apparatus identify a radio base station and restore data for each radio base station.

2. A radio communication method according to claim 1, wherein there are two RLPs for the first radio base station and the second radio base station.

3. A radio mobile device in a radio communication system including at least one radio mobile device, a plurality of radio base stations and a radio base station accommodation apparatus to accommodate them, comprising:
    a radio transmitter-receiver part, a modulator-demodulator circuit, a control part and a memory part, configured to effect operations of;
    handling first-route sequence numbers of radio packets transmitted to a first radio base station and second-route sequence numbers of radio packets transmitted to a second radio base station, of the radio communication system, independently through a Route Selection Protocol (RSP);
    fragmenting an application packet of an up direction from the radio mobile device, into a plurality of packets each having a packet size suited for transmission in the radio communication system;
    performing instantaneous hand-off of the radio mobile device from a first radio base station to a second radio base station, irrespective of transmission status of any plurality of packets of any application packet, where a management of the sequence numbers of radio packets in the radio base station is performed using Radio Link Protocol (RLP) packets each of which includes a RLP header and a part of data;
    in the event that the radio mobile device had transmitted only a portion of the plurality of RLP packets of a subject application packet to the first radio base station using the first-route sequence numbers which were used prior to the hand-off,
    making: the radio mobile device control to transmit a remainder of the plurality of RLP packets of the subject application packet to the first radio base station using the first-route sequence numbers after the hand-off is performed; and the radio mobile device control to apply second-route sequence numbers handled by the second radio base station to fragmented radio packets of a next application packet having all radio packets thereof transmitted only to the second radio base station, and transmit the fragmented radio packets of the next application packet to the second radio base station; and making the radio base station accommodation apparatus identify a radio base station and restore data for each radio base station.

4. A radio mobile device according to claim 3, wherein there are two RLPs for the first radio base station and the second radio base station.

5. A non-transitory, computer-readable medium embodying a radio communication program implemented by a radio communication system including at least one radio mobile device, a plurality of radio base stations and a radio base station accommodation apparatus to accommodate them, the radio communication program, when implemented, effecting operations comprising:

handling first-route sequence numbers of radio packets transmitted to a first radio base station and second-route sequence numbers of radio packets transmitted to a second radio base station, of the radio communication system, independently through a Route Selection Protocol (RSP);

fragmenting an application packet of an up direction from the radio mobile device, into a plurality of packets each having a packet size suited for transmission in the radio communication system;

performing instantaneous hand-off of the radio mobile device from a first radio base station to a second radio base station, irrespective of transmission status of any plurality of packets of any application packet, where a management of the sequence numbers of radio packets in the radio base station is performed using Radio Link Protocol (RLP) packets each of which includes a RLP header and a part of data;

in the event that the radio mobile device had transmitted only a portion of the plurality of RLP packets of a subject application packet to the first radio base station using the first-route sequence numbers which were used prior to the hand-off, making: the radio mobile device control to transmit a remainder of the plurality of RLP packets of the subject application packet to the first radio base station using the first-route sequence numbers after the hand-off is performed; and the radio mobile device control to apply second-route sequence numbers handled by the second radio base station to fragmented radio packets of a next application packet having all radio packets thereof transmitted only to the second radio base station, and transmit the fragmented radio packets of the next application packet to the second radio base station; and making the radio base station accommodation apparatus identify a radio base station and restore data for each radio base station.

6. A non-transitory, computer-readable medium according to claim 5, wherein there are two RLPs for the first radio base station and the second radio base station.

\* \* \* \* \*